(12) United States Patent
Hirsch et al.

(10) Patent No.: US 8,654,234 B2
(45) Date of Patent: Feb. 18, 2014

(54) BI-DIRECTIONAL SCREEN

(75) Inventors: Matthew Hirsch, Somerville, MA (US);
Ramesh Raskar, Cambridge, MA (US);
Henry Holtzman, W. Roxbury, MA
(US); Douglas Lanman, Somerville,
MA (US)

(73) Assignee: Massachusetts Institute of Technology,
Cambridge, MA (US)

( * ) Notice: Subject to any disclaimer, the term of this patent is extended or adjusted under 35 U.S.C. 154(b) by 1031 days.

(21) Appl. No.: 12/622,752

(22) Filed: Nov. 20, 2009

(65) Prior Publication Data

US 2011/0019056 A1     Jan. 27, 2011

Related U.S. Application Data

(60) Provisional application No. 61/228,579, filed on Jul. 26, 2009.

(51) Int. Cl.
*H04N 5/222* (2006.01)
*H04N 5/232* (2006.01)
*H04N 9/083* (2006.01)
*H04B 10/00* (2013.01)

(52) U.S. Cl.
USPC .............. 348/333.01; 348/211.99; 348/211.1; 348/345; 348/290; 398/172

(58) Field of Classification Search
USPC ................. 348/333.01, 211.99, 211.1, 211.4, 348/211.5, 211.6, 211.8, 211.9, 221.1, 348/222.1, 231.2, 231.3, 234, 239, 333.12, 348/345, 349, 49, 54, 333.02, 290, 291; 382/232; 396/268, 89; 398/172, 204; 250/237 R
See application file for complete search history.

(56) References Cited

U.S. PATENT DOCUMENTS

| | | | |
|---|---|---|---|
| 2,420,198 A | 5/1947 | Rosenthal | |
| 4,928,301 A | 5/1990 | Smoot | |
| 5,194,955 A | 3/1993 | Yoneta et al. | |
| 5,639,151 A | 6/1997 | McNelley et al. | |
| 5,777,665 A | 7/1998 | McNelley et al. | |
| 5,801,758 A | 9/1998 | Heirich | |
| 7,009,663 B2 | 3/2006 | Abileah | |
| 7,077,009 B2 | 7/2006 | Lokhorst | |
| 7,525,615 B2 | 4/2009 | Zhang | |
| 7,792,423 B2 * | 9/2010 | Raskar et al. | 396/268 |
| 7,821,561 B2 * | 10/2010 | Tsuboi | 348/333.01 |

(Continued)

OTHER PUBLICATIONS

A. Vrecko, Angular Dependence Determination of LCD Light Shutters Using Poincare Sphere, 2004, Seminar, Dept. of Physics, FMF, University of Adriatic, Ljubljana, Slovenia.

(Continued)

*Primary Examiner* — Twyler Haskins
*Assistant Examiner* — Peter Chon
(74) *Attorney, Agent, or Firm* — Stephen R. Ortis

(57) ABSTRACT

A bidirectional screen alternately switches between a display mode showing conventional graphics and a capture mode in which the LCD backlight is disabled and the LCD displays a pinhole array or a tiled-broadband code. A large-format image sensor is placed behind the liquid crystal layer. Together, the image sensor and LCD function as a mask-based light field camera, capturing an array of images equivalent to that produced by an array of cameras spanning the display surface. The recovered multi-view orthographic imagery is used to passively estimate the depth of scene points from focus.

24 Claims, 9 Drawing Sheets

(56) References Cited

U.S. PATENT DOCUMENTS

| | | | |
|---|---|---|---|
| 7,891,815 B2* | 2/2011 | Nayar et al. | 353/7 |
| 8,073,268 B2* | 12/2011 | Haskell | 382/232 |
| 8,290,358 B1* | 10/2012 | Georgiev | 396/326 |
| 2006/0157640 A1 | 7/2006 | Perlman | |
| 2007/0081200 A1 | 4/2007 | Zomet | |
| 2008/0165267 A1* | 7/2008 | Cok | 348/333.01 |
| 2009/0167922 A1* | 7/2009 | Perlman et al. | 348/340 |
| 2011/0285861 A1* | 11/2011 | Maglaque | 348/207.1 |
| 2012/0007898 A1* | 1/2012 | Pavicic | 345/690 |

OTHER PUBLICATIONS

M. Watanabe, S. Nayar, Rational Filters for Passive Depth for Defocus, International Journal of Computer Vision, vol. 27, Issue 3, pp. 203-205, 1998, Kluwer Academic Publishers, Norwell, MA, USA.

W. Westerman, J. Elias, Multi-Touch: A New Tactile 2-D Gesture Interface for Human-Computer Interaction, Proc. of Human Factors and Ergonomics Society 45th Annual Meeting, Computer Systems, pp. 632-636, 2001, Human Factors and Ergonomics Society, Santa Monica, CA, USA.

C. Zhang, T. Chen, Light Field Capturing with Lensless Cameras, 2005 IEEE Int. Conference on Image Processing, vol. 3, pp. 792-795, 2005, IEEE Signal Processing Society, Piscataway, NJ, USA.

A. Zomet, S. Nayar, Lensless Imaging with a Controllable Aperture, Proc. of 2006 IEEE Computer Society Conference on Computer Vision and Pattern Recognition, vol. 1, pp. 339-346, 2006, IEEE Computer Society, Washington, DC, USA.

H. Benko, S. Feiner, E. Ishak, Cross-Dimensional Gestural Interaction Techniques for Hybrid Immersive Environments, Proc. of 2005 IEEE Conference on Virtual Reality, pp. 209-216, 327, IEEE Computer Society, 2005, Washington, DC, USA.

C. Brown, H. Kato, K. Maeda, B. Hadwen, A Continuous-Grain Silicon-System LCD With Optical Input Function, IEEE Journal of Solid State Circuits, vol. 42, No. 12, pp. 2904-2912, Dec. 2007, IEEE Solid-State Circuits Society, Piscataway, NJ, USA.

A. Levin, R. Fergus, F. Durand, W. Freeman, Image and Depth from a Conventional Camera with a Coded Aperture, International Conference on Computer Graphics and Interactive Techniques, ACM SIGGRAPH 2007 papers, Art. 70, 2607, ACM, New York, NY, USA.

O. Cossairt, S. Nayer, R. Ramamoorthi, Light Field Transfer: Global Illumination Between Real and Synthetic Objects, Proceedings of ACM SIGGRAPH 2008, ACM Transactions on Graphics, vol. 27, Issue 3, Art 57, Aug. 2008, ACM New York, NY, USA.

C. Brown, B. Hadwen, H. Kato, A 2.6 Inch VGA LCD with Optical Input Function using a 1-Transistor Active-Pixel Sensor, 2007 Solid State Circuits Conference, ISSCC 2007, Digest of Technical Papers, pp. 128-129, Feb. 2007, IEEE Solid-State circuits Society, Piscataway, NJ, USA.

H. Benko, A. wilson, DepthTouch: Using Depth Sensing Cameras to Enable Freehand Interactions on and Above the Interactive Surface, Microsoft Research Technical Report, MSR-TR-2009-23, 2009, Microsoft, Redmond, WA, USA.

H. Farid, Range Estimation by Optical Differentiation Ph.D. Thesis, UMI Order # GAX97-27215, Univ. of Penn., 1997, Philadephia, PA, USA.

E. Fenimore, M. Cannon, Coded Aperture Imaging with uniformly redundant arrays, Applied Optics, vol. 17, No. 3, pp. 337-347, Feb. 1978, Optical Society of America, Washington, DC, USA.

C. Forlines, C. Shen, DTLens: Multi-user Tabletop Spatial Data Exploration, Proc. of 18th annual ACM symposium on User interface software and technology, pp. 119-122, 2005, ACM, New York, NY, USA.

P. Dietz, D. Leigh, DiamondTouch: A Multi-User Touch Technology, Proc. of 14th annual ACM symposium on User interface software and technology, pp. 219-226, 2001, ACM, New York, NY, USA.

S. Malik, J. Laszlo, Visual Touchpad: A Two-Handed Gestural Input Device, Proc. of 6th international conference on Multimodal interfaces, pp. 289-296, 2004, ACM, New York, NY, USA.

R. Ng, Fourier Slice Photography, Proc. of ACM SIGGRAPH 2005, ACM TransactionS on Graphics, vol. 24, Issue 3, pp. 735-744, 2005, ACM, New York, NY, USA.

J. Rekimoto, Smartskin: An Infrastructure for Freehand Manipulation on Interactive Surfaces, Proc. of SIGCHI conference on human factors in computing systems, pp. 113-120, 2002, ACM, New York, NY, USA.

D. Lanman, R. Raskar, A. Agrawal, G. Taubin, Shield Fields: Modeling and Capturing 3D Occluders, Proc. of ACM SIGGRAPH Asia 2008, ACM Transactions on Graphics, vol. 27, Issue 5, Art. 131, 2008, ACM, New York, NY, USA.

A. Veeraraghavan, R. Raskar, A. Agrawal, A. Mohan, J. Tumblin, Dappled Photography: Mask Enhanced Cameras for Heterodyned Light Fields and Coded Aperture Refocusing, Int. Conference on Computer Graphics and Interactive Techniques, ACM SIGGRAPH 2007 papers, Art. No. 69, 2007, ACM, New York, NY, USA.

N. Matsushita, J. Rekimoto, HoloWall: Designing a Finger, Hand, Body, and Object Sensitive Wall, Proc. of 10th annual ACM symposium on User interface software and technology, pp. 209-210, 1997, ACM, New York, NY, USA.

M. Fuchs, R. Ramesh, H. Seidel, H. Lensch, Towards Passive 6D Reflectance Reid Displays, Int. Conference on Computer Graphics and Interactive Techniques, ACM SIGGRAPH 2008 Papers, Art. 58, 2008, ACM, New York, NY, USA.

S. Gottesman, E. Fenimore, New family of binary arrays for coded aperture imaging, Applied Optics, vol. 28, No. 20, pp. 4344-4352, Oct. 1989, Optical Society of America, Washington, DC, USA.

W. Hillis, A High-Resolution Imaging Touch Sensor, International Journal of Robotics Research, vol. 1, No. 2, pp. 33-44, Summer 1982, Sage Publications, Newbury Park, CA, USA.

A. Wilson, TouchLight: An Imaging Touch Screen and Display for Gesture-Based Interaction, Proc. of 6th Int. Conf. on Multimodal Interfaces, pp. 69-76, 2004, ACM, New York, NY, USA.

S. Hodges, S. Izadi, A. Butler, A. Rrustemi, B. Buxton, Thinsight: Versatile Multi-touch Sensing for Thin Form-factor Displays, Proc. of 20th annual ACM symposium on User interface software and technology, pp. 259-268 2007, ACM, New York, NY.

S. Izadi, S. Hodges, S. Taylor, D. Rosenfeld, N. Villar, A. Butler, J. VVesthues, Going Beyond the Display: A Surface Technology with an Electronically Switchable Diffuser, Proc. of 21th annual ACM symposium on User interface software and technology, pp. 269-278, 2008, ACM, New York, NY, USA.

M. Levoy P. Hanrahan, Light Field Rendering, Proc. of 23rd annual conference on Computer graphics and interactive techniques, pp. 31-42, 1996, ACM, New York, NY, USA.

C. Liang, T. Lin, B. Wong, C. Liu, H. Chen, Programmable Aperture Photography: Multiplexed Light Field Acquisition, International Conference on Computer Graphics and Interactive Techniques, ACM SIGGRAPH 2008 Papers, Art. 55, 2008, ACM, New York, NY, USA.

S. Malik, U. Laszlo, Visual Touchpad: A Two-Handed Gestural Input Device, Proc. of 6th Int. Conference on Multimodal Interfaces, pp. 289-296, 2004, ACM, New York, NY, USA.

T. Bishop, S. Zanetti, Light Field Superresolution, Proc. of 2009 IEEE Int. Conference on Computational Photography, 2009.

A. Lumsdaine, T. Georgiev, The Focused Plenoptic Camera, Proc. of 2009 IEEE Int. Conference on Computational Photography, 2009.

S. Nayar, P. Belnumeur, Lighting Sensitive Display, ACM Transactions on Graphics, vol. 23, Issue 4, pp. 963-979, 2004, ACM, New York, NY, USA.

S. Lee, W. Buxton, K. Smith, A Multi-Touch Three Dimensional Touch-Sensitive Tablet, ACM SIGCHI Bulletin, vol. 16, Issue 4, pp. 21-25, 1985, ACM, New York, NY, USA.

J. Han, Low-Cost Multi-Touch Sensing Through Frustrated Total Internal Reflection, Proc. of 18th annual ACM Symposium on User interface software and technology, pp. 115-118, 2005, ACM, New York, NY, USA.

S. Nayar, Y. Nakagawa, Shape from Focus, IEEE Transactions on Pattern Analysis and Machine Intelligence, vol. 6, Issue 8, pp. 824-831, 1994, IEEE Computer Society, Washington, DC, USA.

* cited by examiner

PINHOLE

MURA

BI-DIRECTIONAL SCREEN

CROSS-REFERENCE TO RELATED APPLICATION

This application is a non-provisional of, and claims the benefit of the filing date of, U.S. Provisional Patent Application Ser. No. 61/228,579 filed on Jul. 26, 2009.

FIELD OF THE INVENTION

This invention relates generally to display screens and image capture.

BACKGROUND OF THE INVENTION

U.S. Pat. No. 5,801,758 teaches a videoconferencing system with a bidirectional screen, that is, a screen through which images can be both captured and displayed. Disadvantageously, that system cannot determine the distance of an object from the screen.

Sharp Corporation has developed a bidirectional screen comprised of liquid crystal displays (LCDs) co-located at each pixel with optical sensors. Planar Corporation has also developed such a screen. In each case, that screen can determine the location of an object pressed against its surface, by detecting occlusion of light caused by the object. Disadvantageously, that screen cannot determine the distance of an object from the screen.

SUMMARY OF THE INVENTION

It is an object of this invention for a screen to be bidirectional. A "bidirectional screen" means a screen through which images can be both captured and displayed.

It is a further object of this invention to be able to determine the position, including distance from the screen, of an object whose image is being captured.

It is a further object of this invention for a user to be able to input intent and information into a computer by making gestures or movements in front of, and at a distance from, the bidirectional screen.

It is a further object of this invention to be able to implement a bidirectional screen that is sufficiently thin to be practical for use in smart phones, personal digital assistants (PDAs), handheld computers and other handheld devices.

It is a further object of this invention to enable a user to manipulate virtual objects displayed on the screen by making gestures or movements in front of, and at a distance from, said screen.

It is a further object of this invention to enable hybrid interaction, in which a user interacts with a bidirectional screen with both on-screen, touch gestures and off-screen, hover gestures.

It is a further object of this invention to enable a user to control the movements of a virtual avatar displayed on the screen by making gestures in front of, and at a distance from, the screen.

It is a further object of this invention to enable a user to control the relighting of a virtual world displayed on the screen by shining a light emitting device at the screen.

The following is a summary description of an illustrative embodiment of this invention. A screen displays images perceptible to a human viewer part of the time, and displays a spatial light attenuation pattern part of the time. The two modes of display alternate at a sufficiently high rate so that, to a human viewer, it appears as if the former images are being continuously displayed and as if the spatial light attenuation pattern is never displayed. The screen is comprised of liquid crystal displays (LCDs) that alternately display conventional graphic images and the spatial light modulation pattern. The backlight for the LCD is off during the time that the spatial light modulation pattern is displayed, and on during the time that the conventional images perceptible to a human viewer are displayed. The light attenuation pattern may be comprised of tiled broadband codes, such as Modified Uniformly Redundant Array (MURA) tiles. Alternately, the pattern may be comprised of pinhole arrays. At least one light-sensing device is located a small distance behind the screen and measures light that passes through the screen from objects being imaged.

A processor uses these measurements to calculate a four dimensional light field that describes at least some of the light rays that comprise such light. For example, the 4D light field may describe the intensity and direction of such light rays, that is, their vectors. A spatial heterodyning technique may be employed for these calculations. Based on the calculated light field, the processor may further calculate the three dimensional position of objects being imaged, including the distance (depth) of these objects in the imaged scene. When doing so, the processor may use a conventional depth from focus technique.

The light-detecting device is an array of light sensors. The sensing plane is displaced a small distance from the display plane. Alternately, the light-detecting device is a camera or array of cameras.

The spatial light attenuation pattern may be dynamic, i.e., it may be programmed to change in response to properties of the imaged scene. For example, based on the measured depth of an imaged object, the pattern can be reconfigured to locally optimize the tradeoff of spatial resolution vs. angular resolution for imaging that object.

This invention may be implemented as an apparatus comprising, in combination: (a) at least one screen for displaying images, (b) at least one light-sensing device for measuring light that comes from at least one object and that falls upon, or passes through, said screen; and (c) a processing unit for using said measurements to calculate the direction-dependent intensity of at least some of the light rays that comprise said light. Furthermore: (1) at least one of said screens may comprise a liquid crystal display; (2) at least one said light-sensing device may comprise an array of optical sensors, (3) at least one of said screens may be further adapted for displaying said images perceptible to a human viewer part of the time and for displaying at least one spatial light modulator pattern part of the time, (4) at least one said screen may be further adapted for displaying a spatial light modulator pattern comprised of tiled broadband code, (5) the spatial light modulator pattern may be adjusted in real time in response to measured properties of the imaged scene, (6) the spatial light modulator pattern may be reconfigured to locally optimize the tradeoff of spatial resolution vs. angular resolution for imaging an object, (7) at least one said screen may comprise an interface for human interaction with a computer or phone, (8) at least one surface of at least one said screen may be flat, (9) at least one surface of at least one said screen may be curved, (10) said screen or screens may be on or comprise at least part of at least two surfaces of a polyhedron, (11) said apparatus may further comprise a spatial light attenuation mask or a device for displaying said mask, which mask is transparent in the humanly-visible light spectrum but not transparent in at least one other wavelength.

This invention may be implemented as a lensless apparatus for capturing a light field, comprising: (a) at least one screen (I) for displaying, at some times, a pattern that spatially attenuates light from external objects that passes through said screen, and (II) for displaying, at other times, images other than said pattern, (b) an array of sensors for measuring said light, wherein at least some of said sensors are displaced from the display plane, and (c) a processing unit for using said measurements to calculate the direction of at least some of the light rays that comprise said light. Furthermore: (1) said light attenuation pattern may be adjustable, (2) at least one said screen may comprise a liquid crystal display, and (3) said images other than said pattern may perceptible to a human viewer.

This invention may be implemented as a system comprising, in combination: (a) at least one screen, each said screen for displaying a spatial light attenuator at some times and for displaying images other than said light attenuator at other times, and (b) at least one light-measuring device (I) measuring light that passes through said screen from external objects and that is attenuated by said spatial light attenuator, and (II) for outputting data indicative of said measurements for transmission to a processing unit for calculating vectors of at least some light rays comprising said light. Furthermore: (1) said light attenuator may be adjustable in real time, (2) said system may further comprise of a diffuser, which is adapted to be substantially transparent during at least part of time when images are being captured and to be diffuse during at least part of the time when images are displayed for perception by a human viewer, (3) at least part of at least one said screen may be displaced by at least 1 centimeter from at least part of at least one said light-measuring device.

This invention may be implemented as apparatus comprising, in combination: (a) at least one light-sensitive device for (I) measuring light that is from external objects, that falls upon, or passes through, a surface of said apparatus, and that is attenuated by a spatial light modulation pattern, and (II) outputting data indicative of said light measurements for transmission to a processing unit, which processing unit is adapted for calculating, based on said measurements, a light field of four or more dimensions and is further adapted for calculating the depth in an imaged scene of at least one said external object; and (b) at least one display device for displaying images on or through said surface. A liquid crystal display may display said light modulation pattern.

This invention may be implemented as a method comprised of the following steps: (a) displaying images perceptible by a human viewer on or through a surface, (b) attenuating light from external objects that falls upon or passes through said surface, (c) measuring at least some of said light, and (d) using said light measurements to calculate multi-view orthographic imagery of at least one said external object and to calculate the position in three dimensions of said object. Furthermore: (1) said spatial light modulator may be in the pattern of tiled broadband code, and (2) said screen may be comprised of a liquid crystal display.

In an exemplary embodiment of this invention, a liquid crystal display (LCD) displays a pinhole array, or a tiled-broadband code. A processor calculates the angle and intensity of light entering a sensor array displaced a short distance behind the LCD. By correlating data from multiple views, the processor can image objects, such as fingers, that are located beyond the display's surface and measure their distance from the display. The bidirectional screen alternately switches between two modes: a display mode, where the backlight and liquid crystal spatial light modulator function as normal to display the desired output on the screen, and a capture mode where the backlight is disabled and the light modulator displays an array of pinholes or a tiled-broadband code. In this implementation, multiple orthographic images can be captured without blocking the backlight or sacrificing portions of the display.

In an implementation of this invention, the screen alternately switches between a display mode showing conventional graphics and a capture mode in which the LCD backlight is disabled and the LCD displays a pinhole array or a tiled-broadband code. A large-format image sensor is placed behind the liquid crystal layer. Together, the image sensor and LCD function as a mask-based light field camera, capturing an array of images equivalent to that produced by an array of cameras spanning the display surface. The recovered multi-view orthographic imagery is used to passively estimate the depth of scene points from focus.

This invention may be implemented so that it is sufficiently thin for use in a handheld device.

This invention may be implemented as a lensless light field capture device comprised of a single attenuating mask placed slightly in front of an optical sensor array. An LCD may be used for the mask. Instead of an optical sensor array, an array of cameras may be used. Or, alternately, a diffuser and one or more cameras may be substituted for the sensor array.

This Summary of the Invention section is only a simplified introduction to this invention, and is not intended to list all of ways in which the principles of this invention may be embodied.

BRIEF DESCRIPTION OF THE DRAWINGS

In the detailed description which follows, reference will be made to the attached drawings.

DETAILED DESCRIPTION

In an illustrative embodiment of this invention, a screen displays images perceptible to a human viewer part of the time, and displays a spatial light attenuation pattern part of the time. The two modes of display alternate at a sufficiently high rate so that, to a human viewer, it appears as if the former images are being continuously displayed and as if the spatial light attenuation pattern is never displayed. The screen is comprised of liquid crystal displays (LCDs) that alternately display conventional graphic images and the spatial light modulation pattern. The backlight for the LCD is on during the time that the conventional images perceptible to a human viewer are displayed, and off during the time that the spatial light modulation pattern is displayed. The light attenuation pattern, which is not backlit, is not visible to a human viewer. The light attenuation pattern may be comprised of tiled broadband codes, such as Modified Uniformly Redundant Array (MURA) tiles. Alternately, the pattern may be comprised of pinhole arrays. At least one light-sensing device is located a small distance behind the screen and measures light that passes through the screen from objects being imaged.

Figure 1:
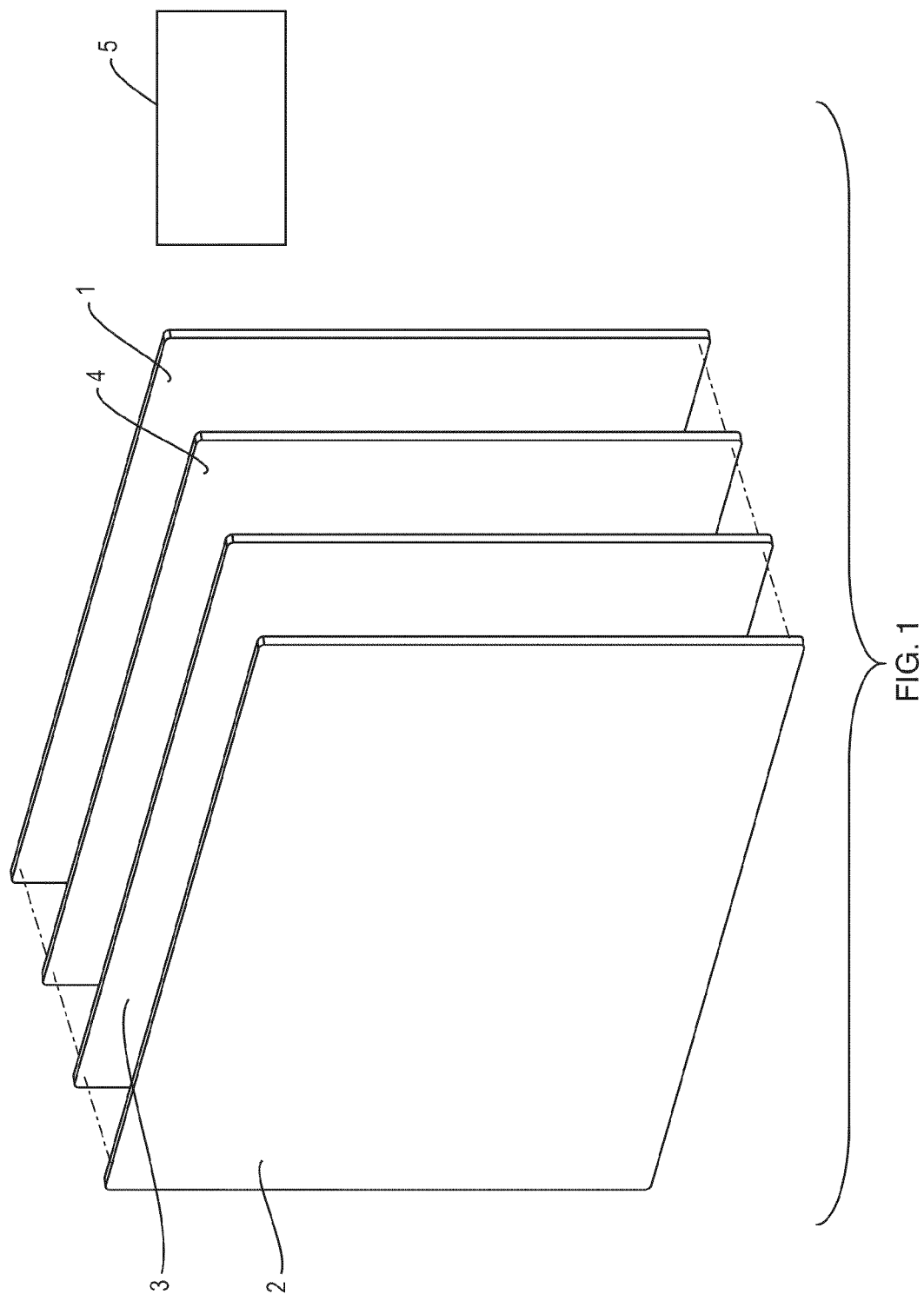
FIG. 1 illustrates an implementation of this invention, in which a sensor array is located behind a liquid crystal display (LCD).

The light-detecting device is comprised of a sparse array of light sensors, or alternately a camera or array of cameras. FIG. 1 is a diagram illustrating how this invention may be implemented with a sensor array as the light-detecting device. The sensor array 1 is mounted at a distance behind the LCD 2. At LCD 2, there is one polarizer. In between the sensor array and the LCD are a spacer 3 and a second polarizer 4. The liquid crystal spatial light modulator displays a mask during capture mode. The modulated light is captured on a sensor array. A processing unit 5 analyzes data captured by the sensor array.

Figure 2:
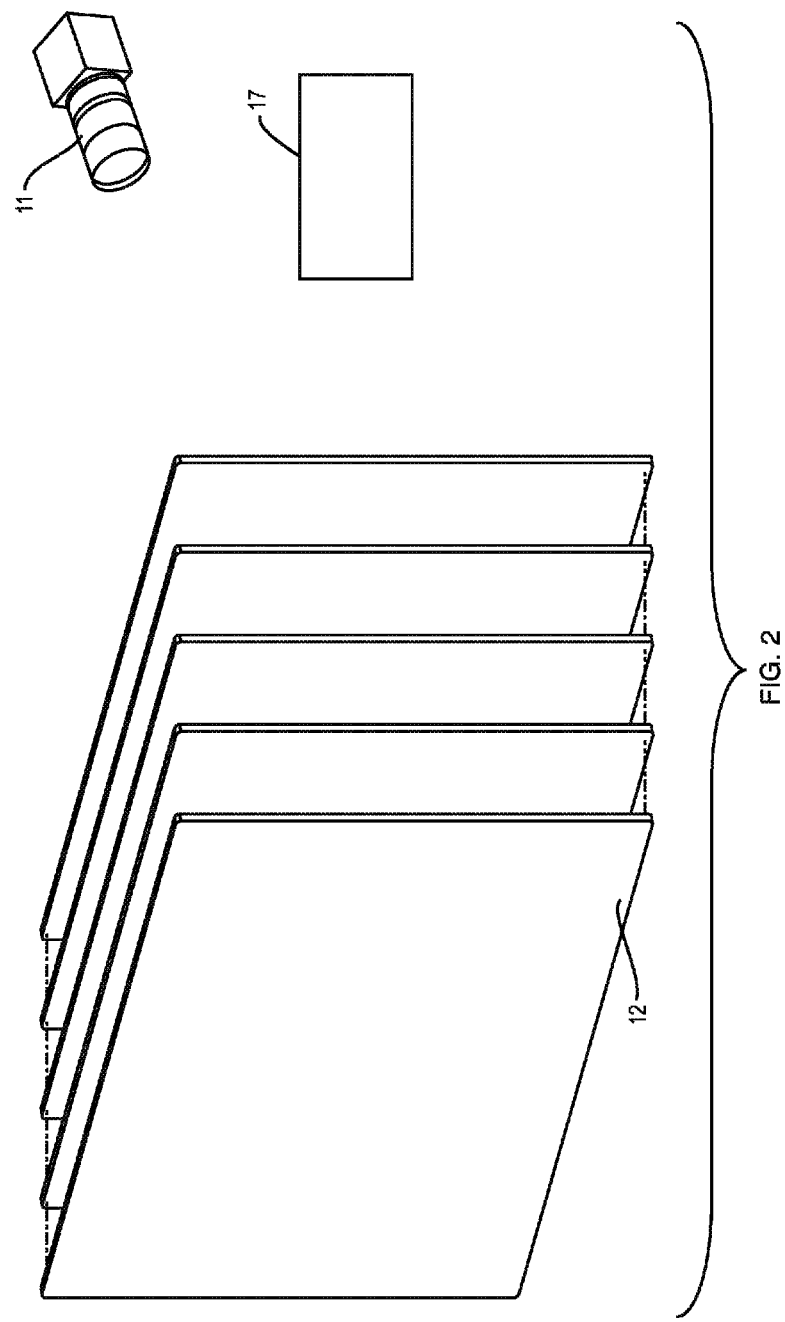
FIG. 2 illustrates an implementation of this invention, in which a camera is located behind an LCD.

"FIG. 2 is a diagram illustrating how this invention may be implemented with a camera as the light-detecting device. A camera 11 is located at a distance behind the LCD 12. At LCD 12, there is one polarizer. The camera images the diffuser. In between the LCD 12 and diffuser are a spacer and a second polarizer. Behind the diffuser is another spacer. A processing unit 17 analyzes data captured by the camera."

A conventional LCD may be modified for use in a bidirectional screen. The modified LCD can be put to double duty; it can alternate between displaying an image and acting as an optical mask. A conventional LCD is composed of two primary components: a backlight and a spatial light modulator. A backlight of a conventional LCD consists of a cold cathode fluorescent lamp (CCFL), a light guide, a rear reflecting surface covering the light guide, a diffuser, and several brightness enhancing films. A spatial light modulator of a conventional LCD is composed of three primary components: a pair of crossed linear polarizers and a layer of liquid crystal molecules sandwiched between glass substrates with embedded electrode arrays.

In an illustrative embodiment of this invention, a conventional Sceptre® X20WG-NagaII 20.1 inch LCD is modified for use in a bidirectional screen, as follows: Brightness-enhancing films are removed. The spatial light modulator is separated from the backlight, and the front diffuser/polarizer is removed. The weak diffuser is retained from the backlight and placed at 2.5 cm from the liquid crystal layer on the side opposite the user. The front polarizer of the LCD is replaced with a linear polarizing polyvinyl alcohol-iodine (PVA) filter placed in direct contact with the diffuser. Commercial LCD screens typically combine the front polarizer with a diffusing layer, as was done on the X20WG. In the present invention, a diffuser in the plane of the spatial light modulator would interfere with the image capture mechanism. In order to easily mount the replacement polarizer on the correct side of the screen, the LCD is modified by mounting it backwards, so that the side typically facing the user is instead facing inward towards the backlight. The backlight functionality is restored by replacing the cold cathode fluorescent light (CCFL)/light guide/reflector component with a set of 16 Luxeon® Endor Rebel cool white LEDs, each producing 540 lumens at 700 mA, arranged evenly behind the LCD. The LEDs are strobed via the parallel port to allow them to be shut off during capture frames.

An LCD may be used to advantage as a spatial light modulator. Modern LCDs have fast response times, which means that the screen can be updated rapidly enough to function both as a spatial light modulator for heterodyned lightfield capture and as a display device.

As the LCD is switched between display and capture mode, the native frame rate of the LCD is reduced, when compared to using it only for display. However, this invention may be implemented with display frame rates that remain above the flicker fusion threshold, so that image flicker does not result.

In an illustrative implementation of this invention, the LCD displays both pinhole arrays and tiled-MURA codes, as follows: The MURA codes are used for real-time interaction and the pinhole arrays for static scene capture. Both the pinholes and MURA tiles repeat every 19×19 LCD pixels, such that the pinhole spacing $d_p$ is 4.92 mm with a square pinhole aperture a of 256 μm. During interactive operation, three frames are sequentially displayed: a MURA code, and two display frames. The screen is refreshed at an average rate of 21 Hz and images are captured each time a MURA frame is displayed. This results in a 7 fps capture. For static scene capture a sequence of two frames, a pinhole mask, and a "black" background frame are captured. In static scene capture, the frame rate of the pinhole capture sequence is adjusted according to scene lighting to allow for a sufficiently long camera exposure time. Background subtraction is used to mitigate the effects of the limited contrast achieved by the spatial light modulator for large incidence angles.

The bidirectional screen may be optimized for on-screen and off-screen interaction modes. In on-screen interactions, a finger, stylus or other object is touching the screen. In off-screen interactions, the imaged object is not touching the screen.

This optimization is effected under the following constraints: The trade-off between spatial and angular resolution is governed by the pinhole spacing (or the equivalent size of a broadband tile) and by the separation between the spatial light modulator and the image plane (e.g., the diffuser). As with any imaging system, the ultimate spatial and angular resolution will be limited by the optical point spread function (PSF).

Advantageously, this invention may be optimized so that it achieves sufficient image resolution to estimate the 3-D position of points located in front of the screen, as well as the variation in position and angle of incident illumination.

The following is a discussion of how to optimize for on-screen and off-screen interaction. First, this discussion considers such optimization where the spatial light modulator is a pinhole array mask. Second, it considers such optimization where such spatial light modulator is a tiled-broadband mask.

Figure 3:
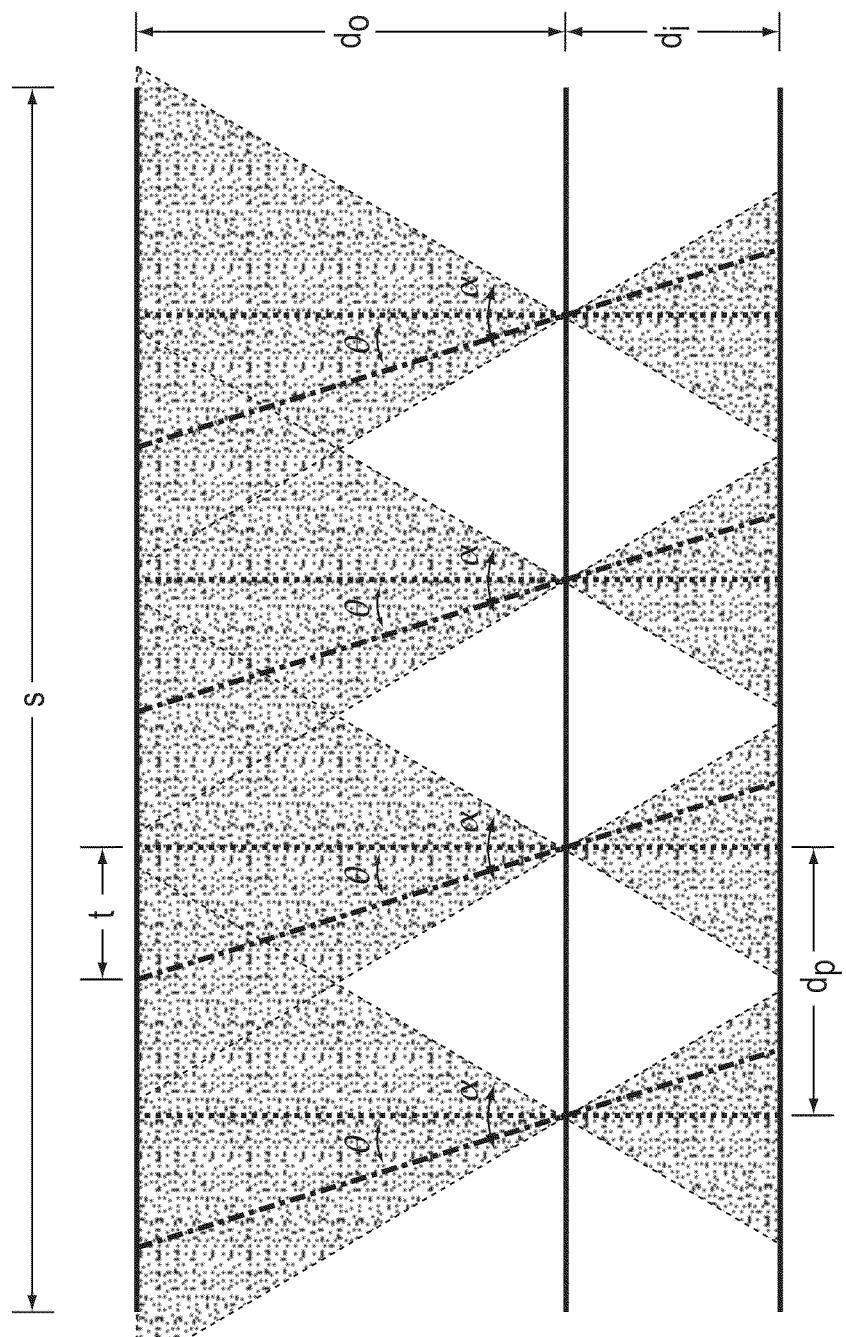
FIG. 3 is a diagram illustrating light rays passing through an array of pinholes.

FIG. 3 illustrates a uniform array of pinhole images. Such an array of images can be decoded to produce a set of multi-view orthographic images. Consider the orthographic image formed by the set of optical rays perpendicular to the display surface, as illustrated in FIG. 3. This image can be generated by concatenating the samples directly below each pinhole on the sensor plane. Orthographic views in different directions can be obtained by sampling points on the sensor plane offset from the center point under each pinhole.

For on-screen interactions—that is, interactions in which a finger, stylus or other object is touching the screen—only the spatial resolution of the imaging device in the plane of the display is of interest. For a pinhole mask, this is simply the total number of displayed pinholes. Thus, to optimize on-screen interactions the pinhole spacing should be reduced as much as possible and the diffuser brought as close as possible to the spatial light modulator.

However, for off-screen interactions—that is, interactions where the imaged object is not touching the screen—additional angular views are required. First, in order to passively estimate the depth of scene points, angular diversity is needed to provide a sufficient baseline for triangulation. Second, in order to facilitate interactions with an off-screen light-emitting widget the captured imagery must sample a wide range of incident lighting directions.

The sensor array (or diffuser, if a camera or array of cameras image the diffuser) may be displaced by a distance from the spatial light modulator. This displacement allows increased angular resolution at the cost of decreased spatial resolution. The increased angular resolution enables off-screen interaction.

According to the principles of this invention, spatial and angular resolution can be traded off to optimize performance for a given application.

In some implementations of this invention, the light attenuation pattern is a pinhole array that creates a uniform array of pinhole images (as illustrated in FIG. 3). Such images can be decoded to produce a set of multi-view orthographic images. As discussed in more detail below, with such a pinhole array, the angular resolution (i.e., the number of orthographic views, $N_{angular}$, created by the array) is determined by the resolution of each pinhole image, and the effective spatial resolution is determined by $N_{spatial}/s$, where $N_{spatial}$ is the number of independent spatial samples in the plane of the sensor, and s is the width of the screen.

Figure 4:
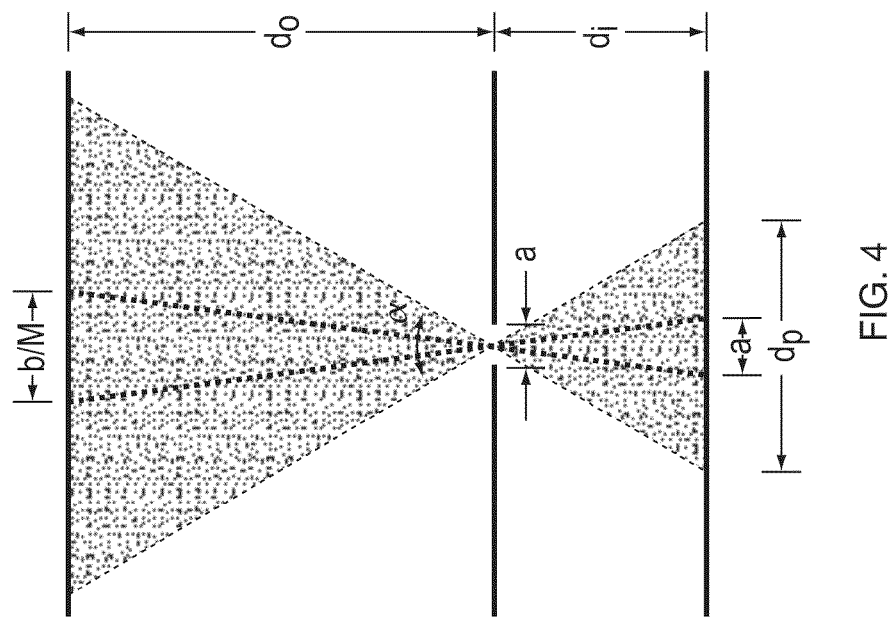
FIG. 4 is a diagram illustrating light rays passing through a pinhole.

FIG. 4 illustrates the design of a single pinhole camera. In FIG. 4, the PSF width is a function of sensor-pinhole separation $d_i$, object distance $d_o$, and circular aperture diameter a. The PSF width is magnified by $M=d_i/d_o$ in the plane at $d_o$.

For such a single pinhole camera, the total width b of the optical point spread function for wavelength $\lambda$, for a point located a distance $d_o$ from the pinhole, may be approximated as $$b(d_i, d_o, a, \lambda) = \frac{2.44 \lambda d_i}{a} + \frac{a(d_o + d_i)}{d_o}. \tag{1}$$

Note that the first and second terms correspond to the approximate blur due to diffraction and the geometric projection of the pinhole aperture onto the sensor plane, respectively.

Now consider an array of pinhole cameras uniformly distributed across a screen of width s and separated by a distance $d_p$, as illustrated in FIG. 3. In such an array, if each pinhole camera has a limited field of view, given by α, then an optimal pinhole spacing $d_p$ is given by:

$$d_p(d_i, d_o, a, \lambda, \alpha) = 2d_i \tan\left(\frac{\alpha}{2}\right) + b(d_i, d_o, a, \lambda). \tag{2}$$

If the pinhole spacing were less than this optimal distance, this would cause neighboring pinhole images to overlap. The limited fields of view may be achieved by vignetting or by the inclusion of an angle-limiting film. Since, in this implementation, the number of orthographic views $N_{angular}$ is determined by the resolution of each pinhole image, the angular resolution of the system is limited to the width of an individual pinhole image (equal to pinhole spacing $d_p$) divided by the PSF width b as follows.

$$N_{angular}(d_i, d_o, a, \lambda, \alpha) = \frac{d_p(d_i, d_o, a, \lambda, \alpha)}{b(d_i, d_o, a, \lambda)}. \tag{3}$$

As noted above, FIG. 3 illustrates how this invention may be implemented with an array of pinhole cameras uniformly distributed across a screen of width s and separated by a distance $d_p$. Advantageously, a limiting field of view may be used to prevent overlapping of neighboring images. As described in more detail below, a depth from focus method may be used to estimate the separation of objects from the display surface. For such a method, it is desirable to place the system components so as to maximize the effective spatial resolution in a plane located a distance $d_o$ from the camera. The total number of independent spatial samples $N_{spatial}$ in this plane is determined by the total number of pinholes and by the effective PSF for objects appearing in this plane, and given is by:

$$N_{spatial}(d_i, d_o, a, \lambda, \alpha; d_p, b) = \min\left(\frac{s}{d_p}, \frac{d_i s}{d_o b}\right), \tag{4}$$

where the first argument is the total number of pinholes and the second argument is the screen width divided by the magnified PSF evaluated in the plane at $d_o$. Thus, the effective spatial resolution is given by $N_{spatial}/s$. Note that, since the system is orthographic, the object plane at $d_o$ is also of width s.

The effective spatial resolution in a plane at $d_o$ varies as a function of the object distance from the pinhole array. For small values of $d_o$, the resolution monotonically increases as the object moves away from pinholes; within this range, the spatial resolution is approximately equal to the total number of pinholes divided by the screen width. For larger values of $d_o$, the resolution monotonically decreases; intuitively, when objects are located far from the display surface, neighboring pinholes produce nearly identical images.

In an illustrative implementation of this invention, the light-detecting device is a camera imaging a diffuser, as shown in FIG. 2. In such an implementation, the diffuser-mask separation $d_i$ is selected to maximize the effective spatial resolution located within 50 cm of the display surface. In such an implementation, the resolution close to the pinhole array drops dramatically according to theory. However, in practice the resolution close to the display remains proportional to the number of pinholes. This is due to that fact that, in such implementation, the pinhole separation $d_p$ is held constant (as opposed to the variable spacing given in Equation 4). Practically, the vignetting introduced by the diffuser and camera's field of view prevents overlapping views even when an object is close to the screen—allowing for a fixed pinhole spacing.

FIG. 3 is a diagram illustrating an array of pinhole cameras uniformly distributed on a screen. The array of pinhole images is resampled to produce a set of orthographic images, each with a different viewing angle θ with respect to the surface normal of the display. The set of optical rays perpendicular to the display surface is sampled underneath the center of each pinhole. Another set of parallel rays is imaged at a uniform grid of points offset from the center pixels under each pinhole.

Figure 5A:
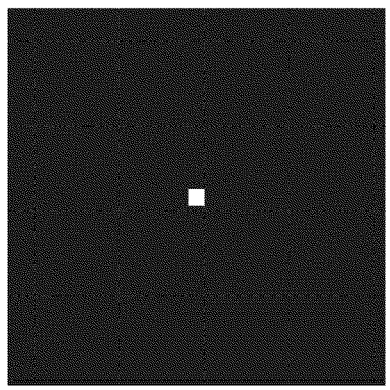
FIG. 5A shows a pinhole tile used in some implementations of this invention.

FIG. 5A illustrates a single pinhole comprised of an opaque set of 19×19 cells, with a central transparent cell.

A disadvantage of a pinhole array is that it severely attenuates light. To overcome this attenuation, extremely bright external lighting is required for real-time interaction. Such lighting impairs image display, due to strong glare and reflections.

Advantageously, instead of a pinhole array, the spatial light modulator may be comprised of tiled broadband codes. Using tiled broadband codes is desirable because it reduces the amount of external light needed, and reduces the exposure time required to capture one image.

Figure 5B:
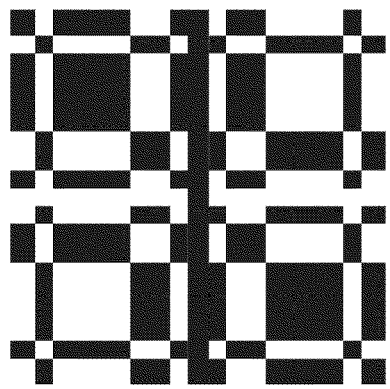
FIG. 5B shows a MURA tile used in some implementations of this invention.

For example, the tiled broadband codes may be comprised of tiled MURA (Modified Uniformly Redundant Array) codes. FIG. 5B shows an example of a single MURA tile.

In an illustrative embodiment of this invention, the LCD displays a tiled-MURA code as the spatial light modulator. Each pinhole is replaced by a single MURA tile of size 19×19 LCD pixels. The MURA pattern is binary (i.e., each pixel is either completely transparent or opaque). In this implementation, the MURA pattern has a 50% duty cycle; thus, the tiled-MURA mask transmits 50% of incident light. Assuming the light-detecting device has a linear radiometric response, a tiled-MURA mask in this implementation allows the external lighting to be dimmed by a factor of 180 (in comparison to pinhole array masks).

The spatio-angular resolution trade-off for tiled-broadband codes is the same as that described in the previous section for pinhole arrays—yielding a multi-view orthographic image array with the same spatial and angular sampling rates.

A user will be concerned with maximizing the spatial and angular resolution of the acquired multi-view imagery. The following provides more details on how to choose the mask separation to optimize image capture, first for pinhole arrays and then for tiled-broadband codes. The term "mask separation" refers to the distance between the mask and the sensor array (or, if a camera or cameras are used instead of a sensor array, the distance between the mask and the diffuser which the camera images).

The total number of light field samples, given by the product of the spatial and angular samples, can be no greater than the number of sensor pixels. In an illustrative implementation of the invention, the discretization due to the LCD further limits the mask resolution, restricting the total number of light field samples to be approximately equal to the total number of pixels in the display (1680×1050=1.764×10$^6$ pixels). Thus, this implementation achieves a spatial resolution of 88×55 samples and an angular resolution of 19×19 samples with a pinhole or MURA tile spacing of $d_p$=4.92 mm and a mask separation of $d_i$=2.5 cm. However, by adjusting the spacing and separation, the spatio-angular resolution trade-off can be adjusted.

Consider a uniform array of pinhole cameras distributed on a screen, as illustrated in FIG. 3. If diffraction is negligible, it is desirable that each pinhole be separated by a distance $d_p$=2$d_i$ tan(α/2), in order to avoid overlap of pinhole images. The mask separation $d_i$ that optimizes the number of samples taken is given by:

$$d_i = \frac{d_p}{2\tan(\alpha/2)}. \quad (5)$$

(To consider diffraction and geometric blur in this calculation, one can use Equation 2, otherwise Equation 5 gives a simpler approximate answer).

The field of view α, shown in FIG. 4, may be determined either by vignetting (e.g., due to a mask) or by an angle-limiting film. Wider fields of view may be desirable for some applications. For a fixed field of view, the user may still choose the mask separation $d_i$ to optimize the effective spatial resolution within the region in front of the display. Thus, Equation 4 can be used to maximize $N_{spatial}$ as a function of $d_i$.

The following is a discussion of how to optimize mask separation when this invention is implemented with tiled-broadband masks to capture reflective light fields. 2D light fields and 1D sensor arrays are described, however the extension to 4D light fields and 2D sensor arrays arrives at the same mask separation $d_m$.

Figure 6:
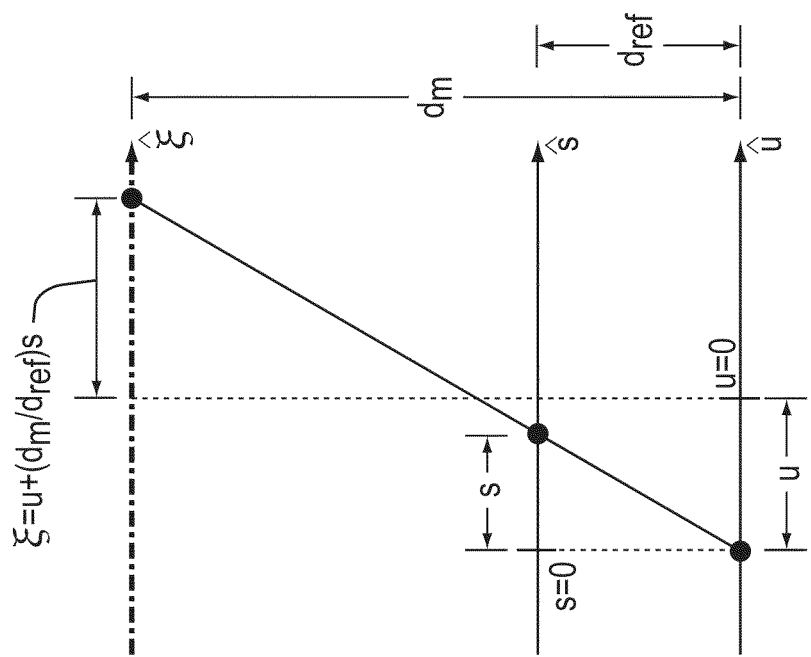
FIG. 6 shows a two-plane parameterization of an optical ray.

FIG. 6 depicts a geometric derivation of tiled-broadband mask separation. It shows a two-plane parameterization (u,s) of an optical ray. In FIG. 6, the ray is shown as a diagonal line. As described below, the ray intersects the mask at ξ=u+($d_m$/$d_{ref}$)s.

Figure 7:
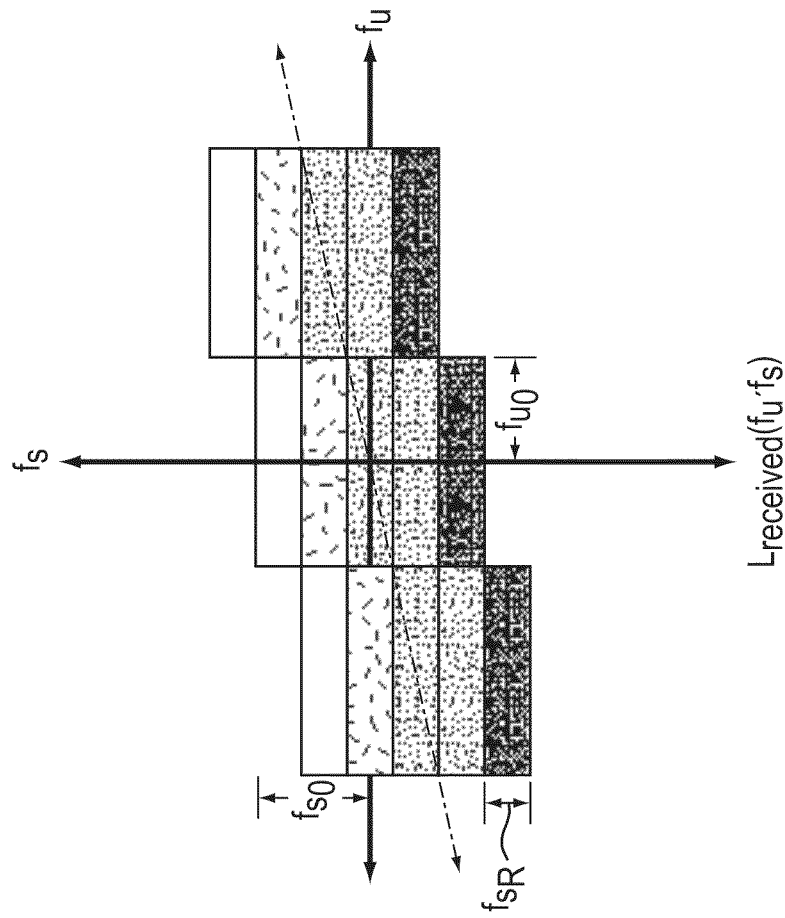
FIG. 7 shows a received light field spectrum containing multiple spectral replicas.

As illustrated in FIG. 7, the received light field spectrum contains multiple spectral replicas. The spectrum of the mask lies along the dashed line in FIG. 7 (i.e., $f_s/f_u$=($d_m$/$d_{ref}$)=$f_{s_R}$/(2$f_{u_0}$))

As shown in FIG. 6, consider the two-plane parameterization, where u denotes the horizontal coordinate (along the sensor or diffuser) and s denotes the horizontal position of intersection (in the local frame of u) of an incident ray with a plane that is a fixed distance $d_{ref}$=1 cm away from, and parallel to, the first plane. A mask separated by $d_m$ from the sensor creates a volumetric occlusion function o(u,s)=m(u+($d_m$/$d_{ref}$)s). Thus, each ray parameterized by coordinates (u,s) is attenuated by the mask's attenuation function m(ξ) evaluated at ξ=u+($d_m$/$d_{ref}$)s. Taking the 2D Fourier transform, with respect to u and s, the mask's spectrum O($f_u$,$f_s$) is given by:

$$O(f_u,f_s)=M(f_u)\delta(f_s-(d_m/d_{ref})f_u), \quad (6)$$

where M($f_ξ$) is the 1D Fourier transform of m(ξ). The optical action of the mask can be modeled by convolving the incident light field spectrum $L_{incident}$($f_u$, $f_s$) with the spectrum O($f_u$, $f_s$).

Assume that $L_{incident}$($f_u$, $f_s$) is bandlimited to $f_{u_0}$ and $f_{s_0}$, as shown in FIG. 7. Since Equation D implies that the mask spectrum lies along the line $f_s$=($d_m$/$d_{ref}$)$f_u$, the mask separation $d_m$ that maximizes the number of samples taken is given by:

$$d_m = \frac{d_{ref} f_{s_R}}{2 f_{u_0}} = \frac{d_p}{2\tan(\alpha/2)}, \quad (7)$$

where $f_{s_R}$=1/(2$d_{ref}$ tan(α/2)) and $f_{u_0}$=1/(2$d_p$).

Based on Equations 5 and 7, in order to maximize the number of samples taken, the pinhole array and tiled-broadband codes may be placed the same distance away from the sensor. Thus, the discussion of how to optimize mask separation concludes with this observation: the mask separation that maximizes the number of samples taken is the same for a pinhole array and for tiled-broadband codes.

According to the principles of this invention, the periodic patterns that comprise the light attenuation mask may be varied. For example, if an LCD forms a mask comprised of an array of pinholes or tiled-broadband code, the LCD can be used to dynamically vary the size, density or other features of the periodic patterns of the mask. An advantage of a dynamic mask is that it may be used for enhancing image resolution and depth estimation.

In some implementations of this invention, the mask is dynamically reconfigured to locally optimize the spatial vs. angular resolution trade-off, based on properties of the scene, such on the measured depth of an imaged object. For example, a dynamically shifted mask may be used to increase spatial resolution for an object near the display (approaching the higher limit imposed by the optical PSF). The dynamic adjustment may be programmable.

As illustrated in FIG. 1, this invention may be implemented with a large format image sensor for light detection. The sensor may be comprised of a sparse array of photodetectors, located behind the individual display pixels of the display screen. For example, this invention may be implemented with a sensor array located behind the spatial light modulating layer of an LCD. Use of a sparse array is advantageous because it does not block much of the light from the LCD backlight and any attenuation tends to be evenly distributed across the screen. Being behind the display, the sparse array does not suffer from occlusions caused by the users.

A small gap is placed between the spatial light modulating and light detecting planes. This gap allows for the calculation of the angle of incident light, as well as its intensity, and thereby the capture of 3-D data. For example, the capture of 3D data may be achieved by multi-view triangulation or depth from focus.

It is desirable for some embodiments of this invention to be sufficiently thin to be practical for use in smart phones, personal digital assistants (PDAs), handheld computers and other handheld devices. In order to achieve such thinness, the large format optical sensing array may be comprised of an array of photosensitive Thin Film Transistors (TFT). The TFT phototransistors are deposited in a thin layer on an optically transparent substrate, such as glass. In some implementations of this invention, an optically-transparent thin film sensor array is embedded within the backlight.

The TFT phototransistors measure light that has passed through a spatial light modulator (e.g., an LCD) and traveled a distance. Typically, the distance is much larger than the scale of a TFT layer. Thus, this invention may be advantageously implemented with LCD driver transistors and the phototransistors not located in the same layer.

A conventional camera (or array of conventional cameras) may be substituted for the sensor array. In some implementations of this invention, the camera (or array of cameras) images a diffuser. As described above, FIG. 2 illustrates an embodiment of this invention, in which such a camera is used.

In an illustrative embodiment of the invention, a pair of Flea® 2 video cameras (available from Point Grey Research, Inc., Richmond, BC, Canada) are placed 1 m behind the diffuser, each imaging approximately half of the diffuser while recording a 1280×960 16-bit grayscale image at 7 fps. For some interaction sessions, these cameras are operated in 8-bit grayscale mode. The camera shutters are triggered from the parallel port in order to synchronize image capture with the LCD frame updates and LED strobing.

An output device may send data indicative of the light measurements made by a light-detecting device to a processor. The output device may be part of a sensor array or other light-sensing device.

A processor may use these measurements to calculate a four dimensional light field that describes at least some of the light rays that comprise such light. For example, the 4D light field may describe the intensity and direction of such light rays, that is, their vectors. A spatial heterodyning technique for mask-based light field capture may be used for these calculations. Based on the calculated light field, the processor may further calculate the three dimensional position of objects being imaged, including the distance (depth) of these objects in the imaged scene. When doing so, the processor may use a conventional depth from focus technique.

A spatial heterodyne decoding method may be used to decode the image on the sensor-plane (or if cameras are used, diffuser-plane), yielding orthographic multi-view imagery equivalent to that provided by a pinhole array mask. The spatial heterodyne method for mask-based light field capture is well known in the art, and may be used for such decoding computations.

According to principles of this invention, standard methods may be used to passively estimate depth from the multi-view imagery obtained. For example, synthetic aperture photography may be used to calculate a focal stack, and then a depth from focus method may be applied to the focal stack.

In order to obtain the set of refocused images (i.e., the focal stack), synthetic aperture photography techniques may be employed. Consider the intersection of the optical rays with a plane at distance $d_o$, as illustrated in FIG. 3. Each orthographic view, whether captured using pinhole arrays or tiled-broadband codes, is translated from the central view by a fixed amount. For an orthographic view rotated by an angle $\theta$ from the display's surface normal, the translation $t(\theta)$ is given by $$t(d_o,\theta)=d_o \tan(\theta). \tag{8}$$

Figure 8B:
FIG. 8B shows that scene, synthetically refocused at a distance of 10 cm.
Figure 8C:
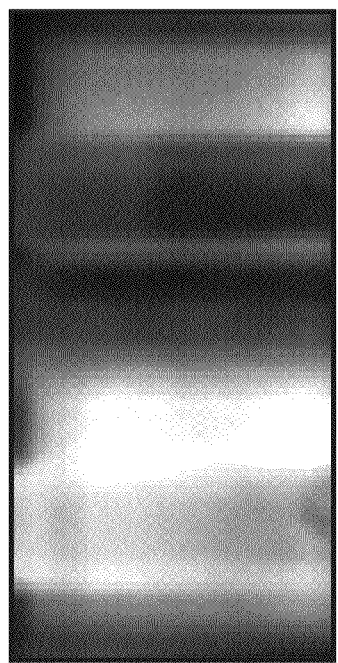
FIG. 8C shows that scene, synthetically refocused at a distance of 15 cm.
Figure 8A:
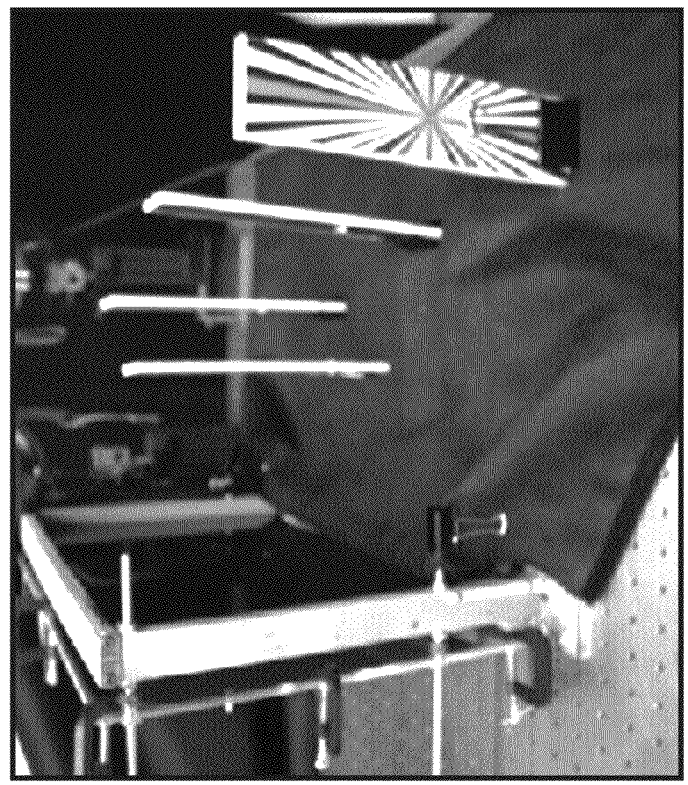
FIG. 8A shows a scene comprised of three textured cards.

FIGS. 9B and 9C show refocused images produced by an illustrative embodiment of this invention, using synthetic aperture refocusing. FIG. 8A is a photograph of a scene comprised of three textured cards. The center card has a printed resolution test chart shown facing the camera on the left. FIGS. 8B and 8C are synthetically refocused images of the scene shown in FIG. 8A, refocused at a distance $d_o$ of 10 cm and 15 cm, respectively.

In an illustrative implementation, the following depth from focus method is used: A focal stack is collected by focusing at multiple depths within the scene. Afterwards, a per-pixel focus measure operator is applied to each image in the focal stack, with the assumption that each image patch will appear with highest contrast when the camera is focused at the depth of the patch. A simple smoothed gradient magnitude focus measure is used. A coarse depth map is obtained by evaluating the maximum value of the focus measure for each pixel. This depth-from-focus technique has the advantage that it can be done in real-time on commodity hardware.

In this depth from focus method, in order to extract depth from focus, one starts with a series of images focused at different distances (a focal stack). The gradient magnitude is found for each image in the focal stack. The resulting gradient magnitude images are smoothed with a local averaging window to make the results more stable. The next step involves pixel stacks. The term "pixel stack" refers to a particular pixel with the same index in each image in the focal stack. The standard deviation for a pixel stack is taken. Pixel stacks with a standard deviation above a predetermined threshold are counted as noise and the corresponding pixel is set to 0 in the resulting depth map. For the remaining pixel stacks, the maximum value in the stack is found. The corresponding pixel in the output depth map is set to the index of the maximum value in the pixel stack.

In an illustrative implementation, the depth resolution is quantified by plotting the focus measure operator response as a function of object distance $d_o$. For each image pixel this response corresponds to the smoothed gradient magnitude evaluated over the set of images refocused at the corresponding depths. The response is compared at three different image points (each located on a different test pattern). The peak response corresponds closely with the true depth. A more accurate depth map can be obtained by fitting a parametric model to the response curves. However, for computational efficiency it is advantageous to assign the per-pixel depth as per-pixel maximum—leading to more outliers than a parametric model would produce.

The processing required by this invention can be performed on a general purpose computer. In an illustrative embodiment of this invention, processing of images is performed with an Intel® Xeon® 8 Core 2.66 GHz processor with 4 Gb of system RAM and an NVIDIA® Quadro® FX 570 graphics card.

The processing required by this invention is well-suited for highly parallel computation, and thus multicore processors may be advantageously used. The processing required by this invention is also well suited for modern video cards, digital signal processing (DSP) chips and Field Programmable Gate Arrays (FPGAs). However, for smaller embedded devices, it may be desirable to use specialized hardware like DSPs, FPGAs, or ASICs (Application-Specific Integrated Circuits).

In some implementations of this invention, external illumination is desirable, such as from the room or a light-emitting widget. This external illumination can potentially interfere with the display mode and reduce the displayed image contrast. To mitigate these effects, an anti-reflective coating may be applied to the face of the screen.

The spatial light modulator may tend to reduce contrast, particularly at large incidence angles. When capturing data with a tiled-MURA mask, this contrast reduction may be compensated for algorithmically. To compensate for low contrast when using a pinhole mask, a background image may be captured with the LCD set to fully opaque, and subtracted from the image recorded as the mask is displayed.

For most applications of this invention, it is desirable to limit the angle of incident light recorded by the sensor to a known limited range. In practice, reflected light from objects in front of the screen will vary continuously over the full hemisphere of incidence angles. However, in most applications of this invention, it is desirable that light varies only over a limited range of angles.

For example, angle limitation is desirable where the mask is a pinhole array or tiled MURA codes. In the case of an array of pinholes, spaced some distance apart, each pinhole creates an image of the scene on the sensor below it. Consider such an image produced by a single pinhole: A ray travels from each point in the scene to a unique point on the sensor. A ray traveling perpendicular to the pinhole aperture strikes the sensor directly below the pinhole. As the angle of incidence of a ray increases, the location the ray strikes on the sensor plane grows further from the point directly below the pinhole. If the angle of incidence of a ray is not limited, the image produced on the sensor will be infinite in size. (This is not the case in practice due to vignetting caused by a finite thickness aperture). It is desirable to choose an angle limit that causes neighboring pinhole images to just touch. If the images overlap, information about the scene is lost. In the case of the tiled broadband mask (such as a MURA mask), it is desirable that the angle be band limited to prevent aliasing. This is effectively the same restriction as in the pinhole case.

The angle-limitation may be achieved by applying an angle-limiting film to the front of the screen. However, such a film also limits the field of view of the display.

Another way to achieve angle limitation is to create a collimator grid, comprised of fins or walls. The height of the fins or walls and their spacing determine the maximum transmission angle. If the collimator grid has square apertures, then it has an angle attenuation pattern that depends on the incoming direction. The collimator grid also reduces resolution somewhat through diffraction blur.

Alternatively, this invention may exploit the angle limiting properties of a camera/diffuser pair. A diffuser with a narrow diffusion profile is chosen. A camera is placed at a distance from the diffuser. In this approach, a ray entering the diffuser will be spread according to the diffusion profile, along the direction of the ray. Rays striking the diffuser at a steep angle will not be spread far enough to enter the camera, and will therefore not be measured. Disadvantageously, with a camera/diffuser pair, the angle limits depend on the position the ray strikes the screen, and thus does not produce an optimal angle limiting effect. The approach, however, produces a reasonable approximation of the optimal angle-limiting effect, particularly as the number of cameras imaging the screen increases, assuming little overlap between cameras. (An "optimal angle-limiting effect" means that the limit angle between the ray and the screen is the same regardless of (1) the position of the ray's intersection with the screen and (2) the angle of rotation of the ray about an axis perpendicular to the screen.) A camera/diffuser pair may add thickness to the invention. For example, a camera may be placed about a meter behind the LCD and diffuser.

Alternatively, the angle limitation may be achieved with a sheet comprised of holographic elements, each element of which is a region that produces a specific set of output ray directions and intensities given a set of input ray directions and intensities. Such a sheet creates an exact angle acceptance profile per pixel. Some diffraction occurs in such a sheet, the amount of diffraction depending on the size of the holographic elements. Such holographic elements are well known in the art. For example, some Holopro™ projector screens and some diffusers made by Luminit, LLC use this type of holographic element.

Because light transport is reversible, limiting the incoming light angle will limit the outgoing light angle, restricting the view angle of the screen. To counteract this problem, this invention may be implemented with a switchable diffuser in front of an LCD. The diffuser is switched to a transparent mode when an image is being captured by the screen, and switched to a diffuse mode when an image is displayed for the user.

Figure 9:
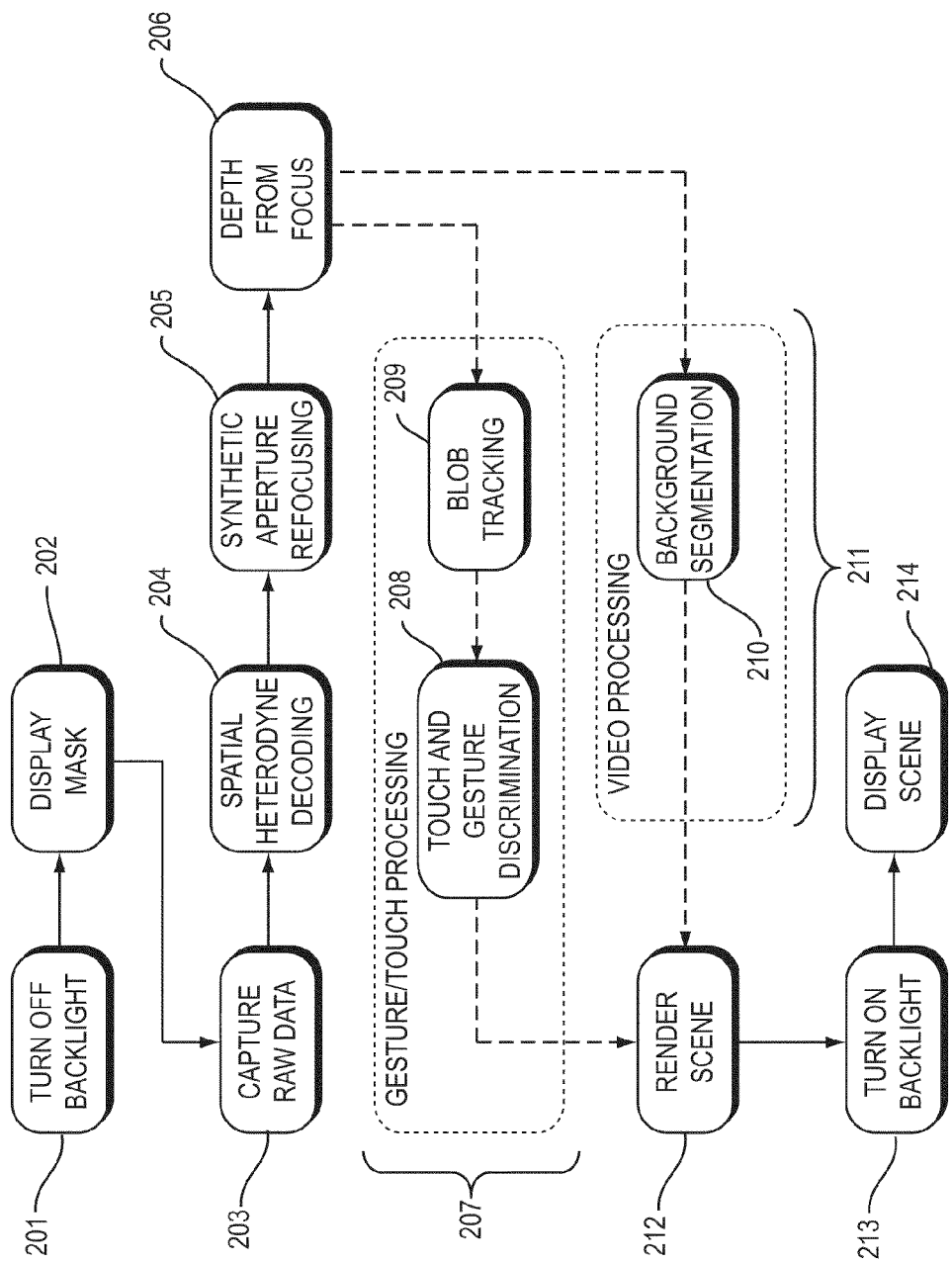
FIG. 9 is a flow chart illustrating steps in a process whereby images are captured, decoded and displayed, in an illustrative implementation of this invention.

FIG. 9 is a flow chart illustrating how images are captured and decoded, and how images are displayed, in an illustrative implementation of this invention. The backlight 201 is turned off, and the LCD displays a mask 202 comprised of tiled broadband code. Light that passes through the mask is captured as raw data 203. The processor decodes this data, using a spatial heterodyne technique 204 that yields multi-view orthographic imagery. The processor passively estimates depth from the multi-view imagery, using a depth from focus method. The processor employs synthetic aperture refocusing 205 to obtain a set of refocused images used in the depth from focus method 206. The flow chart illustrates two possible ways in which the data obtained from the depth from focus method 206 may be used for further processing. First, it can be used for gesture/touch processing 207, such as touch and gesture discrimination 208 and blob tracking 209. Or, second, it can be used for background segmentation 210 in video processing 211. The processor may then issue instructions for rendering the scene 212, turning on the backlight 213, and displaying the scene 214.

There are many different ways in which this invention may be implemented. The following discussion describes some alternate embodiments of this invention. Among other things, different types of masks, spatial light attenuation patterns, light-detection devices and screens may be used.

According to the principles of this invention, a variety of masks may be used for lightfield capture. Here are four examples:

First, a pinhole array may be used as a mask. An array of pinholes is the simplest mask function to calibrate and process. The lightfield can be read from the sensor without significant additional processing, although heterodyne processing could be used, as the pinhole array qualifies as a tiled broadband code. A disadvantage associated with a pinhole array is that the pinhole mask blocks much of the incident light, meaning it is inefficient. A long integration time is required for the sensor to collect sufficient light. Because the LCD is fairly low contrast, background subtraction is also required, in order to remove the contribution of light that leaks through the opaque parts of the LCD. These two factors make it difficult to capture motion using a pinhole array.

Second, MURA codes may be used as a mask: The tiled Modified Uniform Redundant Array (MURA) is a highly efficient tiled broadband code for heterodyne lightfield capture. It has a high ratio of transparent to opaque blocks (~50%) resulting in high light efficiency as compared to other codes. This means a short sensor integration time can be used, which results in a higher capture rate, allowing for capture of motion.

Third, other tiled broadband code (beside MURA codes) may be used as a mask. The heterodyne lightfield decoding technique can be applied with the use of any tiled broadband code.

Fourth, the mask may be dynamically adaptive. For example, the mask may be altered in real time to suit the scene being imaged. The simplest approach is to modify the entire mask at once to better image scenes that are on average near to or far from the screen. A more sophisticated approach is to generate a mask with locally varying frequency, so that regions of the scene closer to the screen trade spatial resolution for angular resolution. Altering the mask function used for lightfield capture allows one to alter the trade-off between spatial and angular resolution.

In an exemplary implementation of this invention, a mask may be comprised of an infrared attenuating film. For example, a passive film with a printed mask pattern may be placed between a display and a light detecting device. This film can be made transparent in the visible spectrum but opaque in infrared. When the light detecting device is made sensitive to infrared light and insensitive to visible light, this allows multiview imagery to be captured by spatial heterodyning in the infrared spectrum without interfering with images displayed in the visible spectrum. Films and sensors meeting this description may be constructed using techniques well known in the art. For example, a passive IR attenuating film may be located between a traditional LCD and sensor pixel array. In that case, the LCD is used for displaying images, and the film is created containing the desired mask pattern. This provides an advantage over the case when the LCD is used to produce the mask as display images are no longer time multiplexed with the mask image, preventing flicker. Instead the input and output from the system are multiplexed in the wavelength of light used. The disadvantages of this approach are that a printed mask will be static and cannot be updated. This will also result in the capture of images in the infrared spectrum, which cannot measure the color of imaged objects.

This invention may be implemented with a variety of different light-detection devices. Here are five examples:

First, printed organic transistors that are light sensitive may be used for light-detection in this invention. These transistors are deposited on a substrate with a printer head. An advantage of such transistors is that they can be very inexpensive to manufacture.

Second, light emitting diodes (LEDs) may be used for light detection. For example, this invention may be implemented with an HDR (high dynamic range) display using reversed biased LEDs as a backlight, with the backlight also acting as the sensor.

Third, a line sensor may be used for light detection. For example, a line sensor may simulate a large area sensor by sweeping out the desired area.

Fourth, an array of lenses, rather than an LCD, may be used to capture a lightfield. The array of lenses (also known as a lenslet array) may or may not be coupled with an LCD device. If an LCD is coupled with a lenslet array, the LCD device is switched between displaying an image and transparent, rather than displaying a mask for spatial heterodyning. An advantage of a lenslet array is that it can be more light efficient than a mask. A second advantage to this approach is that when combined with an LCD screen, the lenslet array can provide lightfield output as well—meaning that the screen could function as a 3D display. A third advantage of the lenslet array is that the lightfield can be read off the sensor, and very little processing is required. However, the display quality, if a lenslet array is used with an LCD, is reduced.

Fifth, the light-detecting device may be comprised of an array of CCD (charge coupled device) or CMOS (complementary metal-oxide-semiconductor) sensors behind the screen.

This invention may be implemented with screens of different sizes. Here are two examples:

First, smaller bidirectional screens may be used in mobile devices, such as cell phones, smart phones, personal digital assistants (PDAs), and handheld computers.

Second, larger sized bidirectional screens, such as a screen that covers a large portion of a wall, may be used. These larger screens may be used for a wide variety of applications, including full body motion tracking, joining spaces together with a virtual window, or group interaction.

Figure 10A:
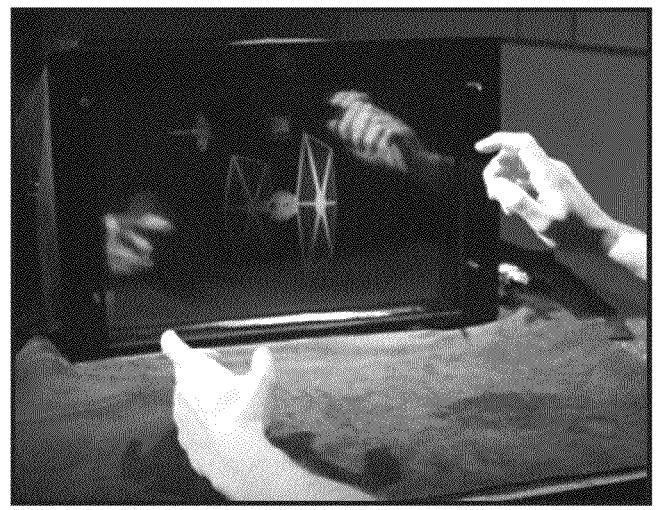
FIG. 10A shows an implementation of this invention, in which a user manipulates virtual objects displayed on the screen by making off-screen gestures with his or her hands.
Figure 10B:
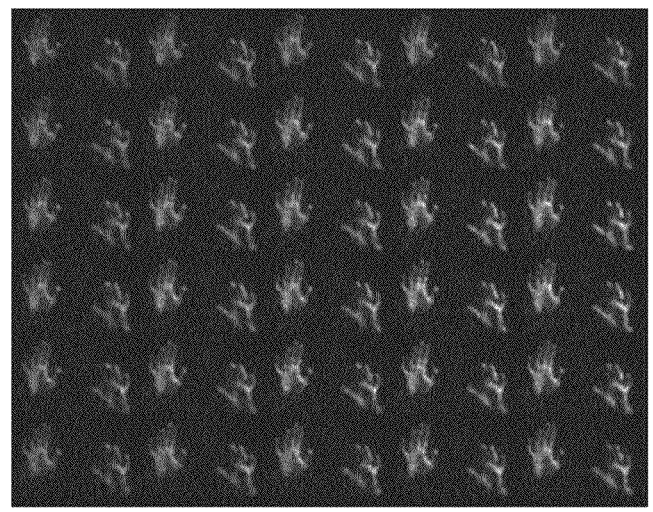
FIG. 10B shows multi-view orthographic imagery recorded in real time using a mask displayed by a LCD spatial light modulator.
Figure 10C:
FIG. 10C shows an image refocused at the depth of the hand on the right side, using synthetic aperture refocusing.

According to principles of this invention, the bidirectional screen supports on-screen multi-touch and off-screen hover gestures by providing a real-time depth map, allowing 3D tracking of objects in front of the display. In these implementations, imaging is performed in real-time, enabling the real-time detection of off-screen gestures. A user may input intention or data, by either touching the screen or making off-screen gestures. This on-screen/off-screen capability leads to many applications of this invention. Here are three examples:

First, using this on-screen/off-screen capability, this invention may be implemented as a model viewer. FIG. 10 shows an example of a model viewer application, where the user controls the displayed view of a virtual model by moving his or her hand. Several models are presented along the top of the screen. When the user touches a model, it is brought to the center of the display. Once selected, the user can manipulate the model with off-screen gestures—that is, gestures made while not touching the screen. The model can be rotated along two axes by moving the hand left to right and up and down. Scaling is controlled by the distance between the hand and the screen. Touching the model again puts it away.

Figure 11:
FIG. 11 shows an implementation of this invention, in which a user directs the movement of an avatar in a virtual world, by making off-screen gestures with his or her hands.

Second, using this on-screen/off-screen capability, this invention may be implemented as world navigator. FIG. 11 shows an example of a world navigator application, where the user uses controls an avatar in a virtual environment, by touching the screen or making off-screen gestures. Moving the hand left and right turns, whereas moving the hand up and down changes gaze. Reaching towards or away from the screen affects movement of the avatar.

Third, a flat bidirectional screen that supports both on-screen and off-screen interaction can be advantageously used in cell phones, smart phones, personal digital assistants (PDAs), handheld computers and other mobile devices.

Figure 12:
FIG. 12 shows an implementation of this invention, in which a user controls relighting of a virtual scene displayed on the screen, by pointing a real flashlight at the screen.

This invention may be implemented in a variety of ways that involve interacting with a bidirectional screen by intentionally altering the light striking it. Here are two examples:

First, this invention may be implemented such that a light wand controls a relighting application. The light wand may be pointed at, and illuminate, the bidirectional screen, thereby controlling the relighting of a virtual scene displayed on the screen. FIG. 12 illustrates a relighting application controlled with a real flashlight. The light field is used to estimate the flashlight position. A similar virtual light is created—as if the real flashlight was shining into the virtual world. In this example, the user translates a flashlight in front of the display. For a narrow beam of light, a single pinhole (or MURA tile) may be illuminated. Below this single pinhole (or MURA tile), a subset of the light sensors is activated by the beam. The position of the pinhole, in combination with the position of the sensors that are illuminated, may be used to determine the direction along which light entered the screen. A virtual light source may then be used to light the simulated scene—as if the viewer is shining light directly into the virtual world. In this example, the bidirectional screen can determine not only where the light wand is aimed, but also the incidence angle of light cast on the display surface.

Second, this invention may be implemented in such a way that a person may interact with objects rendered on a screen by adjusting the angle, position and intensity of light emitted from a light wand. These adjustments in the emitted light may cause the orientation, position and state of the rendered objects to change.

In some instantiations of this invention, as LED may be used to provide illumination for a light wand.

This invention can be implemented in many other ways. Here are four examples:

First, in some implementations, this invention tracks multiple points in free-space, allowing identification and response to multiple users.

Second, this invention may be used in a feedback loop with the capture mode, to illuminate gesturing body parts or enhance the appearance of nearby objects.

Third, this invention may be used to track the user's head to provide simulated parallax views. For example, such tracking may be achieved from a bidirectional screen in a flat panel, small device.

Fourth, this invention may be implemented for depth keying in video. In such implementations, this invention can be advantageously used to enable background substitution and in-scene rendering.

The term "light" means electromagnetic radiation of any wavelength, whether or not visible to a human viewer.

Conclusion

It is to be understood that the methods and apparatus which have been described above are merely illustrative applications of the principles of the invention. Numerous modifications may be made by those skilled in the art without departing from the scope of the invention. The scope of this invention is limited only by the claims that follow.

The objects (i.e., purposes) of this invention mentioned in the Summary of the Invention do not limit this invention. This invention may be implemented in different ways such that all, some or none of these purposes apply to any particular implementation.

What is claimed is:

1. Apparatus comprising, in combination:
   (a) a screen for displaying images at some times, which images are perceptible to a human viewer, and for displaying a dynamically adjustable spatial light modulator pattern at other times;
   (b) one or more light-sensing devices for taking measurements of light from a scene, which light falls upon, or passes through, the screen; and
   (c) one or more processors for using the measurements to calculate a light field that describes direction and intensity of light rays that comprise the light;
   wherein the apparatus is configured such that when the light from the scene intersects a plane in the apparatus, a plurality of regions exist in at least part of the plane, such that each respective region out of the plurality of regions is illuminated by light from a particular direction, which particular direction applies to only one region out of the plurality of regions.

2. The apparatus of claim 1, wherein the screen comprises a liquid crystal display.

3. The apparatus of claim 1, wherein the light sensing devices comprise an array of optical sensors.

4. The apparatus of claim 1, wherein:
   (a) the pattern comprises both (i) pinholes at some times and (ii) tiles of tiled broadband codes at other times;
   (b) the tiles are for real-time interaction; and
   (c) the pinholes are for static scene capture.

5. The apparatus of claim 1, wherein the spatial light modulator pattern comprises tiled broadband code.

6. The apparatus of claim 1, wherein the apparatus is further adapted for adjusting the spatial light modulator pattern in real time in response to measured properties of the scene.

7. The apparatus of claim 6, wherein the apparatus is further adapted for reconfiguring the spatial light modulator pattern to locally optimize a tradeoff of spatial resolution vs. angular resolution for imaging an object in the scene.

8. The apparatus of claim 1, wherein light rays comprising a view from a particular direction are parallel to each other when intersecting the plane.

9. The apparatus of claim 1, wherein the one or more processors are adapted to employ spatial heterodyning to calculate the light field.

10. The apparatus of claim 1, wherein the one or more processors are adapted for calculating orthographic multi-view imagery.

11. The apparatus of claim 10, wherein the one or more processors are adapted to estimate depth from the orthographic multi-view imagery.

12. The apparatus of claim 1, further comprising a spatial light attenuation mask or a device for displaying the mask, which mask is transparent in the humanly-visible light spectrum but not transparent in at least one other wavelength.

13. The apparatus of claim 1, wherein each respective region out of the plurality of regions consists of subregions which are not connected to each other.

14. Apparatus comprising, in combination:
(a) a screen
(i) for displaying, at some times, a dynamically adjustable pattern that spatially attenuates light from external objects that passes through the screen, and
(ii) for displaying, at other times, images other than the pattern, which images are perceptible to a human viewer; and
(b) a light field capture device comprising an array of sensors for taking measurements of the light; and
(c) one or more processors for using the measurements to calculate the direction and intensity of at least some of the light rays that comprise the light;
wherein
the apparatus is configured for relighting of a virtual scene displayed on the screen,
which relighting is controllable by a user shining a light source at the screen, and
causes the virtual scene to be relit as if the light source were shining into the virtual scene.

15. Apparatus comprising, in combination:
(a) a screen for displaying images at some times, which images are perceptible to a human viewer, and for displaying a dynamically adjustable spatial light modulator pattern at other times;
(b) one or more light-sensing devices for taking measurements of light from a scene, which light falls upon, or passes through, the screen; and
(c) one or more processors for using the measurements to calculate a light field that describes direction and intensity of light rays that comprise the light;
wherein the apparatus is configured to generate a mask in real time with locally varying frequency so that spatial resolution is increased for regions of the scene closer to the screen.

16. Apparatus comprising, in combination:
(a) a screen
(i) for displaying, at some times, a dynamically adjustable pattern that spatially attenuates light from external objects that passes through the screen, and
(ii) for displaying, at other times, images other than the pattern,
which images are perceptible to a human viewer; and
(b) a light field capture device comprising an array of sensors for taking measurements of the light; and
(c) one or more processors for using the measurements to calculate the direction and intensity of at least some of the light rays that comprise the light;
wherein the apparatus is configured for interaction with a human, in which interaction the orientation, position or state of objects rendered on the screen is controllable by adjusting angle, position or intensity of light emitted from a light source.

17. Apparatus comprising, in combination:
(a) at least one light-sensitive device for
(i) taking measurements of light that is from external objects, that falls upon, or passes through, a surface of the apparatus, and that is attenuated by a dynamically adjustable spatial light modulation pattern, and
(ii) outputting data indicative of the light measurements for transmission to one or more processors, which one or more processors are adapted for calculating, based on the measurements, a light field of four or more dimensions and are further adapted for calculating the depth in an imaged scene of at least one of the external objects; and
(b) at least one display device for displaying images other than the pattern on or through the surface;
wherein the apparatus is configured such that when the light from the scene intersects a plane in the apparatus,
a plurality of regions exist in at least part of the plane, such that each respective region out of the plurality of regions is illuminated by light from a particular direction, which particular direction applies to only one region out of the plurality of regions.

18. The apparatus of claim 17, wherein light rays comprising a view from a particular direction are parallel to each other when intersecting the plane.

19. The apparatus of claim 17, wherein the one or more processors are adapted to calculate orthographic multi-view imagery.

20. A method comprised of the following steps, in combination:
(a) using an electronic display device
(i) to display at some times images perceptible by a human viewer on or through a surface, and
(ii) to display at other times a dynamically adjustable spatial light modulator pattern for attenuating light from the scene, which light falls upon or passes through the surface;
(c) using a light-sensing device to take measurements of the light; and
(d) using the measurements to calculate position in three dimensions of an object in the scene;
wherein when the light from the scene intersects a plane after passing through the surface,
a plurality of regions in the plane exist in at least part of the plane, such that each respective region out of the plurality of regions is illuminated by light from a particular direction, which particular direction applies to only one region out of the plurality of regions.

21. The method of claim 20, wherein the spatial light modulator is in the pattern of tiled broadband code.

22. The method of apparatus of claim 20, wherein light rays comprising a view from a particular direction are parallel to each other when intersecting the plane.

23. The method of claim 20, wherein the method further comprises using the one or more processors to calculate orthographic multi-view imagery.

24. The method of claim 20, wherein each respective region out of the plurality of regions consists of subregions which are not connected to each other.

* * * * *